(12) United States Patent
Underwood et al.

(10) Patent No.: US 10,693,818 B2
(45) Date of Patent: *Jun. 23, 2020

(54) PACKET TRACKING TECHNIQUES FOR COMMUNICATION NETWORKS

(71) Applicant: Intel Corporation, Santa Clara, CA (US)

(72) Inventors: Keith D. Underwood, Powell, TN (US); Charles A. Giefer, Seattle, WA (US)

(73) Assignee: INTEL CORPORATION, Santa Clara, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/189,323

(22) Filed: Nov. 13, 2018

(65) Prior Publication Data

US 2019/0268287 A1    Aug. 29, 2019

Related U.S. Application Data

(63) Continuation of application No. 14/977,561, filed on Dec. 21, 2015, now Pat. No. 10,128,984.

(51) Int. Cl.
*H04L 12/861*    (2013.01)
(52) U.S. Cl.
CPC .............................. *H04L 49/9057* (2013.01)
(58) Field of Classification Search
CPC .................................................... H04L 49/9057
See application file for complete search history.

(56) References Cited

U.S. PATENT DOCUMENTS

| | | | | |
|---|---|---|---|---|
| 6,493,343 | B1 * | 12/2002 | Garcia | G06F 12/0292 370/394 |
| 6,931,569 | B2 * | 8/2005 | Fong | H04L 1/16 714/18 |
| 7,089,304 | B2 * | 8/2006 | Graham | H04L 43/00 709/203 |
| 7,499,395 | B2 * | 3/2009 | Rahman | H04L 43/50 370/229 |
| 7,624,190 | B1 * | 11/2009 | Aviani | H04L 67/2804 709/232 |
| 8,452,888 | B2 * | 5/2013 | Chan | G06F 9/546 370/235 |
| 9,369,395 | B2 * | 6/2016 | Spencer, IV | H04L 69/24 |

(Continued)

*Primary Examiner* — Asad M Nawaz
*Assistant Examiner* — Thomas R Cairns

(57) ABSTRACT

Packet tracking techniques for communication networks are described. In an example embodiment, an apparatus may comprise circuitry, a tracking component for execution by the circuitry to, in response to a request of an initiator device to establish a packet transfer session, determine whether tracking information for the packet transfer session can be locally maintained and in response to a determination that the tracking information for the packet transfer session cannot be locally maintained, identify one or more tracking parameters for retention at the initiator device, and a communication component for execution by the circuitry to send an acceptance message to grant the request of the initiator device to establish the packet transfer session, the acceptance message to indicate a request for retention of the one or more tracking parameters. Other embodiments are described and claimed.

26 Claims, 10 Drawing Sheets

(56) References Cited

U.S. PATENT DOCUMENTS

| | | | |
|---|---|---|---|
| 2007/0256122 A1* | 11/2007 | Foo | H04L 63/1433 726/5 |
| 2009/0104892 A1* | 4/2009 | Jones | H04L 41/00 455/412.1 |
| 2013/0259040 A1* | 10/2013 | Anantharam | H04L 45/44 370/390 |
| 2014/0040488 A1* | 2/2014 | Small | H04L 67/142 709/228 |

* cited by examiner

*FIG. 8*

Storage Medium 800

Computer Executable
Instructions for 600

Computer Executable
Instructions for 700

PACKET TRACKING TECHNIQUES FOR COMMUNICATION NETWORKS

CROSS-REFERENCE TO RELATED APPLICATIONS

This application is a continuation of, claims the benefit of and priority to previously filed U.S. patent application Ser. No. 14/977,561 filed Dec. 21, 2015, entitled "PACKET TRACKING TECHNIQUES FOR COMMUNICATION NETWORKS", which is incorporated herein by reference in its entirety.

GOVERNMENT RIGHTS

This invention was made with Government support under contract number H98230-13-D-0124 awarded by the Department of Defense. The Government has certain rights in this invention.

TECHNICAL FIELD

Embodiments herein generally relate to communications between computing devices in communication networks.

BACKGROUND

In order to exchange messages with each other, applications running on different computing devices in a communication network may make use of application-layer connectivity provided by a connectivity fabric of that communication network. At the transport layer, messages exchanged by such applications may be segmented, and the segments may be encapsulated in packets for transmission. A computing device receiving a message addressed to a recipient application running on that computing device may need to confirm that it has received all of the packets in which segments of the message have been encapsulated and notify the recipient application that the transfer of the message is complete.

BRIEF DESCRIPTION OF THE DRAWINGS

FIG. 8 illustrates an embodiment of a storage medium.

DETAILED DESCRIPTION

Various embodiments may be generally directed to packet tracking techniques for communication networks. In an example embodiment, an apparatus may comprise circuitry, a tracking component for execution by the circuitry to, in response to a request of an initiator device to establish a packet transfer session, determine whether tracking information for the packet transfer session can be locally maintained and in response to a determination that the tracking information for the packet transfer session cannot be locally maintained, identify one or more tracking parameters for retention at the initiator device, and a communication component for execution by the circuitry to send an acceptance message to grant the request of the initiator device to establish the packet transfer session, the acceptance message to indicate a request for retention of the one or more tracking parameters. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
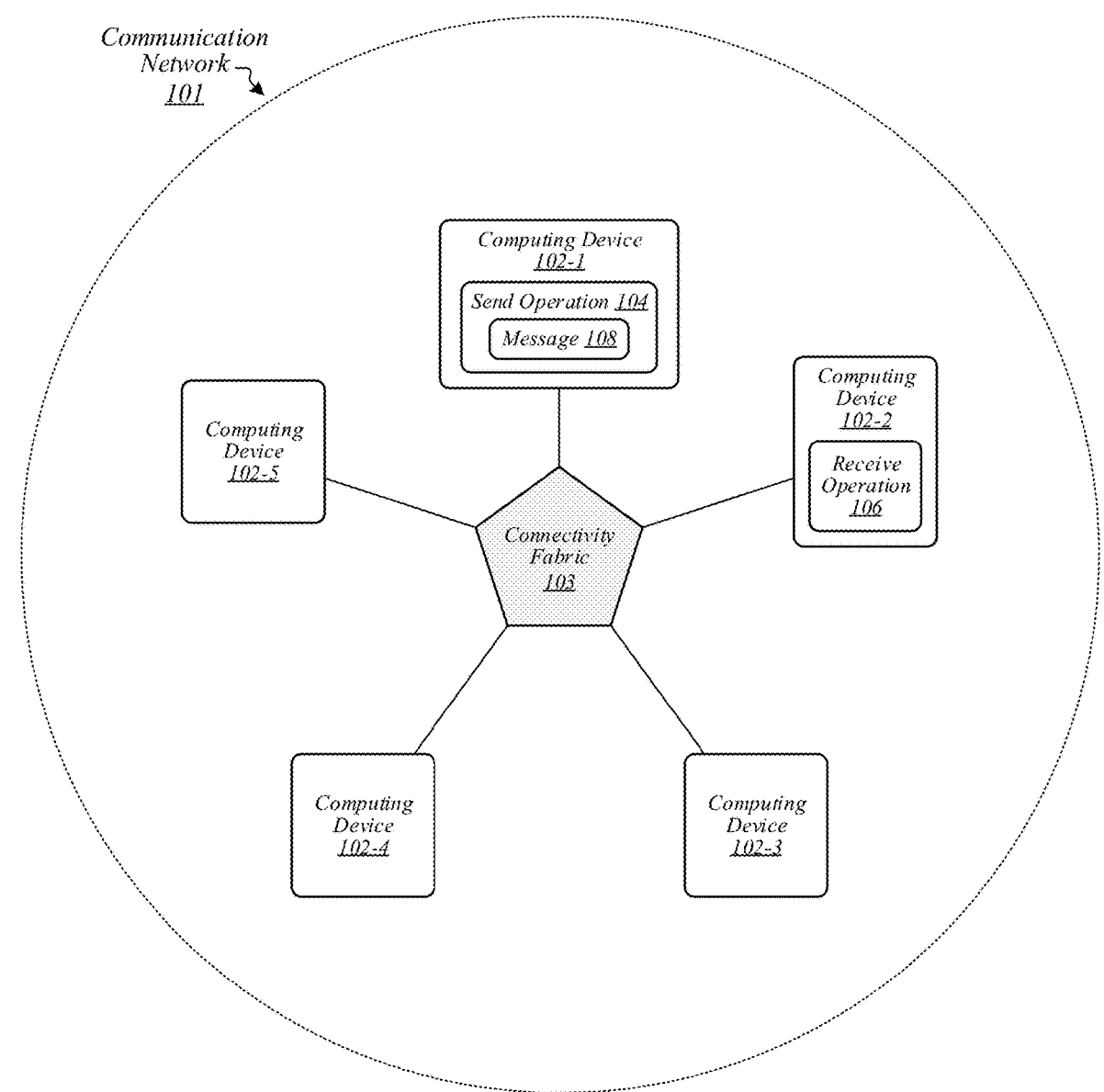
FIG. 1 illustrates an embodiment of a first operating environment.

FIG. 1 illustrates an example of an operating environment 100 that may be representative of various embodiments. In operating environment 100, a communication network 101 comprises a plurality of computing devices 102-1 to 102-5. In some embodiments, a connectivity fabric 103 of communication network 101 may generally enable communication among computing devices 102-1 to 102-5. In various embodiments, in the context of the application layer, connectivity fabric 103 may generally enable the use of application-layer send operations to send messages for receipt via application-layer receive operations. In the example of FIG. 1, computing device 102-1 may use a send operation 104 to send a message 108 to computing device 102-2 via connectivity fabric 103, and computing device 102-2 may use a receive operation 106 to receive message 108 from computing device 102-1 via connectivity fabric 103. The embodiments are not limited to this example.

Figure 2:
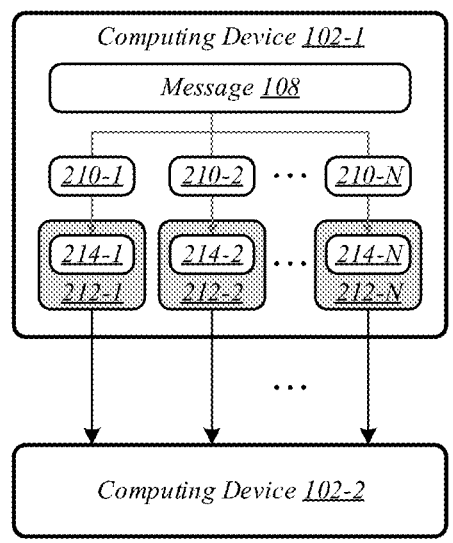
FIG. 2 illustrates an embodiment of a second operating environment.

FIG. 2 illustrates an example of an operating environment 200 that may be representative of some embodiments. In operating environment 200, in order to send message 108 to computing device 102-2, computing device 102-1 may partition some or all of message 108 into a plurality of data segments 210-1 to 210-N, where N is an integer greater than 1. In various embodiments, computing device 102-1 may then send each one of the plurality of data segments 210-1 to 210-N to computing device 102-2 in a separate respective one of packets 212-1 to 212-N. In some embodiments, each one of packets 212-1 to 212-N may comprise a respective one of payloads 214-1 to 214-N, each of which may contain the data segment to be carried by its associated packet. In various embodiments, computing device 102-2 may receive packets 212-1 to 212-N, extract data segments 210-1 to 210-N from respective payloads 214-1 to 214-N, and reconstruct message 108 using data segments 210-1 to 210-N. The embodiments are not limited to this example.

Figure 3:
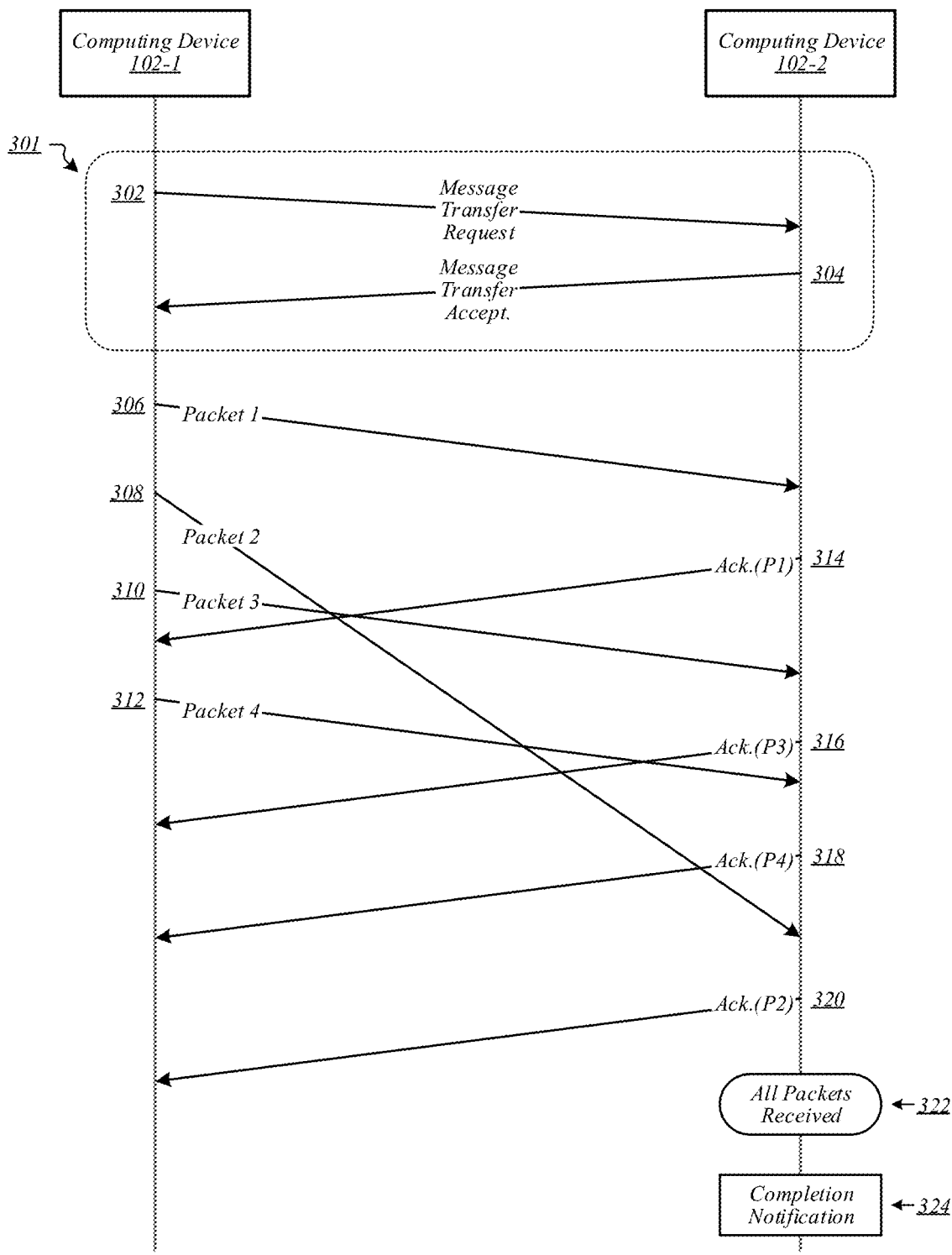
FIG. 3 illustrates an embodiment of a communication flow.

FIG. 3 illustrates an example of a communications flow 300 that may be representative of a series of communications that may be exchanged between computing devices 102-1 and 102-2 in some embodiments. In various embodiments, the communications that computing devices 102-1 and 102-2 exchange according to communications flow 300 may comprise transport-layer communications. In some embodiments, computing devices 102-1 and 102-2 may exchange such transport-layer communications in support of application-layer communications between computing devices 102-1 and 102-2. For example, communications flow 300 may be representative of communications that computing devices 102-1 and 102-2 may exchange in various embodiments in conjunction with the transmission of packets 212-1 to 212-N from computing device 102-1 to computing device 102-2 in operating environment 200 of FIG. 2, and packets 212-1 to 212-N may comprise the various segments of application-layer message 108. The embodiments are not limited to this example.

As shown in FIG. 3, communications flow 300 may begin at 302, where computing device 102-1 may send a message transfer request message to computing device 102-2. In some embodiments, this message transfer request may generally comprise a request on the part of a transport-layer entity at computing device 102-1 to establish a transport-layer session with a transport-layer entity at computing device 102-2 and to send one or more packets to the transport-layer entity at computing device 102-2. At 304, computing device 102-2 may send a message transfer acceptance message to computing device 102-1. In various embodiments, this message transfer acceptance message may generally constitute an indication on the part of the transport-layer entity at computing device 102-2 that the transport-layer entity at computing device 102-1 may send the one or more packets as requested. In some embodiments, the message transfer request message sent at 302 may comprise a request-to-send (RTS), and the message transfer acceptance message sent at 304 may comprise a clear-to-send (CTS). In various embodiments, the exchange of the message transfer request and acceptance messages may constitute a handshake 301. In some embodiments, handshake 301 may generally comprise a wire-level handshake between respective transport-layer entities at computing devices 102-1 and 102-2. In various embodiments, the completion of handshake 301 may establish a transport-layer session between the respective transport-layer entities at computing devices 102-1 and 102-2. The embodiments are not limited in this context.

In some embodiments, following receipt of the message transfer acceptance message from computing device 102-2, computing device 102-1 may send packets 1, 2, 3, and 4 to computing device 102-2 at 306, 308, 310, and 312, respectively. In various embodiments, the respective payloads of packets 1, 2, 3, and 4 may each contain segments of an application-layer message such as message 108 of FIG. 2. In the context of operating environment 200 of FIG. 2, communications flow 300 may be representative of some embodiments in which N is equal to 4, such that message 108 is partitioned into four segments 210-1 to 210-4 which are delivered to computing device 102-2 in the respective payloads 214-1 to 214-4 of four packets 212-1 to 212-4. As reflected in FIG. 3, packets 1, 2, 3, and 4 may not necessarily arrive at computing device 102-2 in the same order as that in which they are sent by computing device 102-1. In the example depicted in FIG. 3, packet 2 is the second packet sent by computing device 102-1 but the last packet received by computing device 102-2. At each of 314, 316, 318, and 320, computing device 102-2 may send an acknowledgment to acknowledge receipt of a respective one of packets 1, 2, 3, and 4. Namely, computing device 102-2 may send a first acknowledgment at 314 to acknowledge packet 1, a second acknowledgment at 316 to acknowledge packet 3, a third acknowledgment at 318 to acknowledge packet 4, and a fourth acknowledgment at 320 to acknowledge packet 2. At 322, the transport-layer entity at computing device 102-2 may determine that each required packet has been received. At 324, message recipient application at computing device 102-2 may be notified that the transfer of the application-layer message is complete. The embodiments are not limited to this example.

Figure 4:
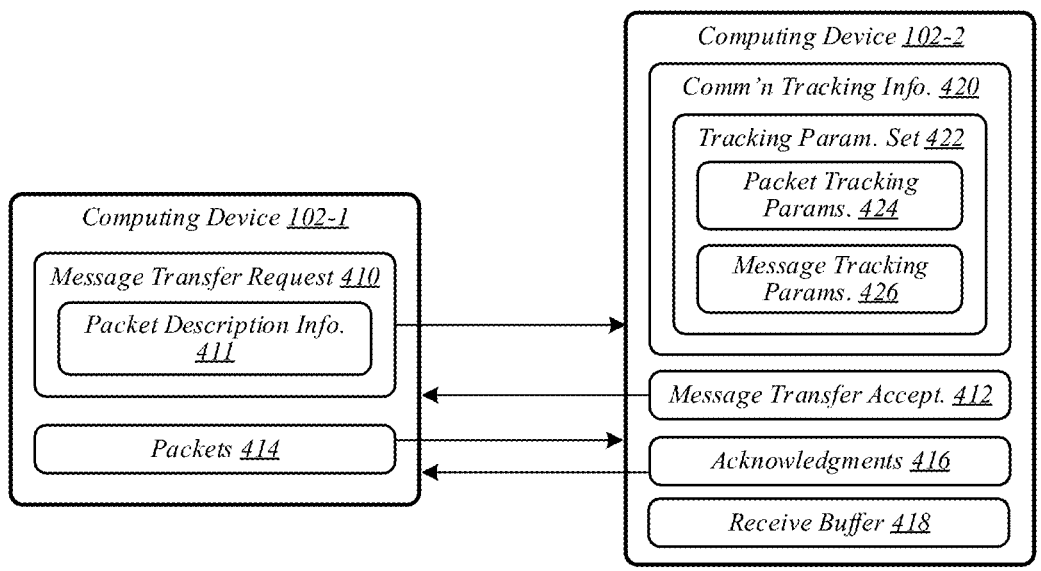
FIG. 4 illustrates an embodiment of a third operating environment.

FIG. 4 illustrates an example of an operating environment 400 that may be representative of various embodiments. In operating environment 400, computing devices 102-1 and 102-2 may generally engage in a transport-layer communications exchange in support of the delivery of an application-layer message from computing device 102-1 to computing device 102-2. In some embodiments, this transport-layer communications exchange may be of a same or similar nature as that of communications flow 300 of FIG. 3. In various embodiments, computing device 102-1 may send a message transfer request 410 to computing device 102-2. In some embodiments, message transfer request 410 may comprise an RTS. In various embodiments, packet transfer request 410 may be the same as—or similar to—the message transfer request sent at 302 in communications flow 300 of FIG. 3. In some embodiments, computing device 102-2 may grant message transfer request 410 by sending a message transfer acceptance 412 to computing device 102-1. In various embodiments, message transfer acceptance 412 may comprise a CTS. In some embodiments, message transfer acceptance 412 may be the same as—or similar to—the message transfer acceptance sent at 304 in communications flow 300 of FIG. 3.

In various embodiments, in response to receipt of message transfer acceptance 412, computing device 102-1 may initiate a packet transfer procedure. In some embodiments, according to the packet transfer procedure, computing device 102-1 may transmit one or more packets 414 to computing device 102-2. In various embodiments, packets 414 may be the same as—or similar to—the packets sent at 306, 308, 310, and 312 in communications flow 300 of FIG. 3. In some embodiments, computing device 102-2 may send one or more acknowledgments 416 to acknowledge one or more respective received packets 414. In various embodiments, acknowledgments 416 may be the same as—or similar to—the acknowledgments sent at 314, 316, 318, and 320 in communications flow 300 of FIG. 3. In some embodiments, in conjunction with granting message transfer request 410, computing device 102-2 may designate a receive buffer 418 in which to store packets received via the packet transfer procedure that computing device 102-1 initiates in response to message transfer acceptance 412. In various embodiments, computing device 102-2 may then store each received packet 414 in that receive buffer 418. The embodiments are not limited in this context.

In some embodiments, for any given transport-layer session via which it receives packets from another computing device, computing device 102-2 may maintain communication tracking information 420. In various embodiments, in operating environment 400, computing devices 102-1 and 102-2 may exchange message transfer request 410 and message transfer acceptance 412 and establish a transport-layer session, computing device 102-2 may receive packets 414 via that transport-layer session, and computing device 102-2 may maintain communication tracking information 420 for that transport-layer session. In some embodiments, computing device 102-2 may maintain respective communication tracking information 420 for each of multiple transport-layer sessions concurrently. In various embodiments, the communication tracking information 420 for any given transport-layer session may comprise a set of one or more tracking parameters. In some embodiments, for example, the communication tracking information 420 for the transport-layer session via which computing device 102-2 receives packets 414 may constitute one or more parameters comprised in a tracking parameter set 422. In various embodiments, computing device 102-2 may allocate respective tracking states for each of multiple transport-layer sessions, and may associate the respective communication tracking information 420 for each transport-layer session with the tracking state for that transport-layer session. In some embodiments, for example, computing device 102-2 may allocate a tracking state for the transport-layer session via which it receives packets 414 and may associate tracking parameter set 422 with that tracking state. The embodiments are not limited in this context.

In various embodiments, tracking parameter set 422 may include packet tracking parameters 424. In some embodiments, packet tracking parameters 424 may generally comprise one or more parameters that describe characteristics associated with the packets 414 that computing device 102-2 is to receive from computing device 102-1. In various embodiments, packet tracking parameters 424 may include one or more parameters indicating and/or usable to determine a size of each packet 414 to be received from computing device 102-1. In some embodiments, packet tracking parameters 424 may include one or more parameters indicating and/or usable to determine a number of packets 414 to be received from computing device 102-1. In various embodiments, packet tracking parameters 424 may include one or more parameters indicating and/or usable to determine a collective amount of data comprised in the payloads of the various packets 414 to be received from computing device 102-1. In some such embodiments, this collective amount of data may correspond to a size of an application-layer message, such as message 108 of FIG. 2. In various embodiments, packet tracking parameters 424 may include one or more parameters identified based on packet description information 411 comprised in message transfer request 410. For example, in some embodiments, message transfer request 410 may comprise packet description information 411 that identifies the size of each packet 414 and the size of the application-layer message that packets 414 are being used to convey, and computing device 102-2 may maintain packet tracking parameters 424 that identify these values. The embodiments are not limited to this example.

In various embodiments, tracking parameter set 422 may include one or more message tracking parameters 426. In some embodiments, message tracking parameters 426 may generally comprise one or more parameters that indicate a correspondence between the packets 414 that computing device 102-2 may receive from computing device 102-1 and an application-layer message, operation, or process. In various embodiments, message tracking parameters 426 may include one or more parameters indicating and/or usable to determine an application-layer receive operation to which a message reconstructed using packets 414 is to be delivered. In some embodiments, message tracking parameters 426 may include one or more parameters indicating an association between receive buffer 418 and such a receive operation. The embodiments are not limited to these examples.

In various embodiments, knowledge of packet tracking parameters 424 may generally enable computing device 102-2 to determine whether it has received all of the packets that it was intended to receive in conjunction with a given transport-layer session. For example, in some embodiments, the determination at 322 in communications flow 300 of FIG. 3 that computing device 102-2 has received each required packet may be made based on packet tracking parameters 424. In various embodiments, knowledge of message tracking parameters 426 may generally enable computing device 102-2 to identify an application-layer operation or process that should be notified of the successful completion of a given packet transfer. For example, in some embodiments, computing device 102-2 may identify receive operation 106 of FIG. 1 based on message tracking parameters 426 and generate an event to notify receive operation 106 of the successful receipt of message 108. The embodiments are not limited to these examples.

In various embodiments, there may be a limit to the overall amount of packet tracking information 420 that computing device 102-2 can maintain at any given point in time. For example, in some embodiments, computing device 102-2 may only be able to maintain a certain number of tracking states and/or tracking parameter sets 422. In various embodiments, if such a limit has already been reached at the time of receipt of message transfer request 410, computing device 102-2 may be unable to maintain communication tracking information 420 for its transport-layer session with computing device 102-1. For example, computing device 102-2 may be unable to maintain a tracking parameter set 422 for its transport-layer session with computing device 102-1 if it is unable to allocate a tracking state for that session. In some embodiments, if computing device 102-2 is unable to maintain communication tracking information 420, then computing device 102-2 may be unaware that it has received each of the required packets 414 once it has in fact received each such packet. For example, when it sends an acknowledgment of packet 2 at 320 in communications flow 300 of FIG. 3, computing device 102-2 may be unaware that it has received each of the four packets that it is intended to receive if it has not been able to maintain communication tracking information 420. In various embodiments, the inability to maintain communication tracking information 420 may also render computing device 102-2 unaware of the identity of the receive operation that is to be notified of the successful completion of the message transfer. The embodiments are not limited in this context.

Disclosed herein are packet tracking techniques that may be implemented in some embodiments in order to support the delivery of a message to a target device via a transport-layer packet transfer when the target device is not able to maintain tracking information for the transport-layer session via which the packets are transferred. According to various such techniques, a computing device that receives a message transfer request at a point in time at which it is unable to create a new tracking state entry may send a message transfer acceptance to accept the request, and the message transfer acceptance message may comprise a tracking delegation request to indicate that an initiator device is to maintain tracking information for the session. The embodiments are not limited in this context.

Figure 5:
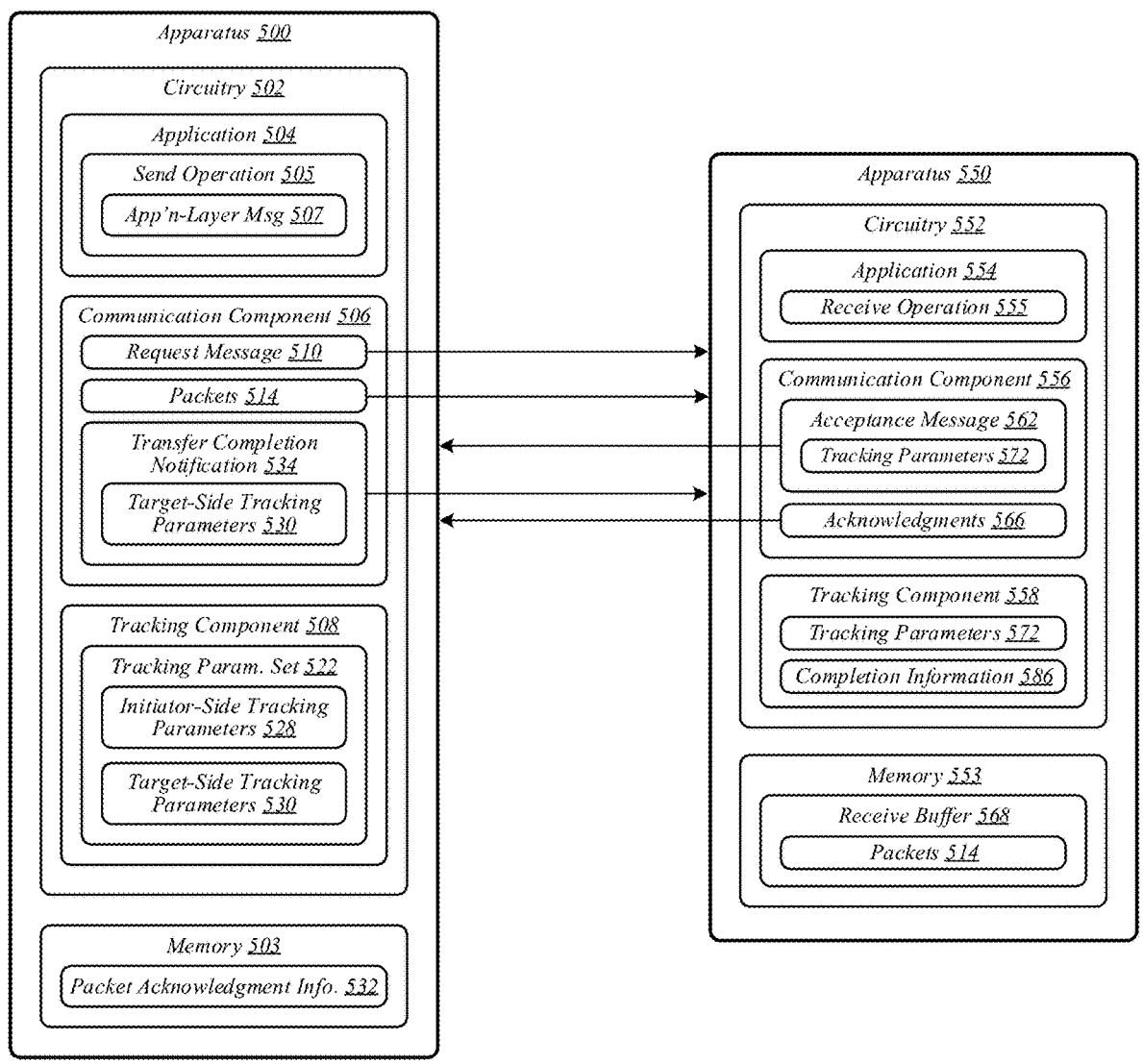
FIG. 5 illustrates an embodiment of a first apparatus and an embodiment of a second apparatus.

FIG. 5 illustrates examples of apparatuses 500 and 550 that may be representative of apparatuses that may implement one or more of the disclosed packet tracking techniques according to some embodiments. Apparatus 500 may generally be representative of an initiator device that sends a request to establish a packet transfer session with a target device in order to send packets to that target device. Apparatus 550 may generally be representative of a target device that receives such a request. According to various embodiments, apparatus 500 may be representative of computing device 102-1 of FIGS. 1-4, and apparatus 550 may be representative of computing device 102-2 of FIGS. 1-4. As shown in FIG. 5, both of apparatuses 500 and 550 comprise multiple elements, including respective circuitry 502 and 552 and respective memories 503 and 553. The embodiments, however, are not limited to the type, number, or arrangement of elements shown in this figure.

In some embodiments, apparatuses 500 and 550 may comprise respective circuitry 502 and 552. Circuitry 502 and circuitry 552 may both be arranged to execute one or more software or firmware implemented modules or components, which may include respective communication components 506 and 556 and respective tracking components 508 and 558. In various embodiments, either or both of circuitry 502 and circuitry 552 may comprise circuitry of a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). In some embodiments, either or both of circuitry 502 and circuitry 552 may comprise circuitry of a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, either or both of circuitry 502 and circuitry 552 may be implemented using any of various commercially available processors, including—without limitation—AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. The embodiments are not limited in this context.

In various embodiments, apparatuses 500 and 550 may comprise or be arranged to communicatively couple with respective memories 503 and 553. Either or both of memories 503 and 553 may be implemented using any machine-readable or computer-readable media capable of storing data, including both volatile and non-volatile memory. For example, either or both of memories 503 and 553 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memories 503 and 553 may be included on the same respective integrated circuits as circuitry 502 and circuitry 552, or alternatively some portion or all of memories 503 and 553 may be disposed on integrated circuits or other media, for example hard disk drives, that are external to the respective integrated circuits of circuitry 502 and circuitry 552. Although memories 503 and 553 are comprised within respective apparatuses 500 and 550 in FIG. 5, memories 503 and 553 may be external to respective apparatuses 500 and 550 in some embodiments. The embodiments are not limited in this context.

In some embodiments, communication component 506 may be executed by circuitry 502 to generally manage communications between apparatus 500 and one or more remote devices. In various embodiments, communication component 556 may be executed by circuitry 552 to generally manage communications between apparatus 550 and one or more remote devices. In some embodiments, communication components 506 and 556 may be operative to send and/or receive messages in a communication network, such as communication network 101 of FIG. 1. In various embodiments, communications components 506 and 556 may additionally comprise logic, circuitry, and/or instructions operative to perform various operations in support of such communications. Examples of such operations may include—without limitation—selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, tracking component 508 may be executed by circuitry 502 to maintain tracking information in support of communications performed by communication component 506. In various embodiments, tracking component 558 may be executed by circuitry 552 to maintain tracking information in support of communications performed by communication component 556. In some embodiments, tracking components 508 and 558 may maintain tracking information for various transport-layer sessions during which respective communication components 506 and 556 may send and/or receive packets. In various embodiments, tracking components 508 and 558 may maintain tracking information that identifies applications, application-layer messages, and/or send/receive operations associated with such transport-layer sessions. The embodiments are not limited in this context.

In some embodiments, circuitry 502 may execute an application 504 at apparatus 500, and circuitry 552 may execute an application 554 at apparatus 550. In various embodiments, applications 504 and 554 may comprise respective instances of a same application. In some other embodiments, applications 504 and 554 may comprise different applications. In various embodiments, application-layer connectivity between apparatuses 500 and 550 may generally enable applications 504 and 554 to send application-layer messages to each other. In some embodiments, application 504 may use a send operation 505 to send an application-layer message 507 to application 554, and application 554 may use a receive operation 555 to receive that application-layer message 507. In various embodiments, application-layer message 507 may be the same as—or similar to—message 108 of FIGS. 1 and 2. In some embodiments, in order to enable application-layer message 507 to be conveyed to apparatus 550, communication component 506 may partition application-layer message 507 into a plurality of data segments and send each such data segment to apparatus 550 in one of a respective plurality of packets 514. In various embodiments, packets 514 may be the same as—or similar to—packets 414 of FIG. 4. The embodiments are not limited in this context.

In some embodiments, communication component 506 may send a request message 510 to apparatus 550. In various embodiments, request message 510 may comprise a request-to-send (RTS) message. In some embodiments, request message 510 may comprise a request to establish a packet transfer session with apparatus 550 in order to send packets 514 to apparatus 550. In various such embodiments, the packet transfer session to be established may comprise a transport-layer session. In some embodiments, communication component 556 may receive request message 510 at apparatus 550 and may elect to grant the request to establish the packet transfer session. In various embodiments, tracking component 558 may determine whether tracking information for the packet transfer session can be locally maintained. In some embodiments, tracking component 558 may determine whether tracking information for the packet transfer session can be locally maintained based on whether a tracking state can be allocated for the packet transfer session. In various embodiments, in response to a determination that tracking information for the packet transfer session cannot be locally maintained, tracking component 558 may identify one or more tracking parameters 572 to be retained at apparatus 500 during the packet transfer session. The embodiments are not limited in this context.

In some embodiments, communication component 556 may select a receive buffer 568 for use at apparatus 550 to store packets 514 to be received during the packet transfer session. In various embodiments, receive buffer 568 may comprise or correspond to a set of memory resources of memory 553. In some embodiments, communication component 556 may identify one or more receive buffers that are allocated to receive operation 555 and may select receive buffer 568 from among those one or more identified receive buffers. In various embodiments, communication component 556 may send an acceptance message 562 to apparatus 500 in order to grant the request to establish the packet transfer session. In some embodiments, acceptance message 562 may comprise a clear-to-send (CTS) message. In various embodiments, communication component 556 may use acceptance message 562 to indicate a request that tracking parameters 572 be retained at apparatus 500 during the packet transfer session. In some embodiments, communication component 556 may include tracking parameters 572 within acceptance message 562. In various embodiments, tracking parameters 572 may include an identifier associated with receive buffer 568. In some embodiments, tracking parameters 572 may include an identifier associated with receive operation 555. In various embodiments, acceptance message 562 may comprise a message of a designated type for use in indicating requests for initiator-side tracking parameter retention. For example, in some embodiments, acceptance message 562 may comprise an enhanced CTS (ECTS) designated for use when indicating an initiator-side tracking parameter retention request. In various other embodiments, communication component 556 may set a flag, bit, field, parameter value, or other type of information element within acceptance message 562 in order to use acceptance message 562 to indicate the request for initiator-side tracking parameter retention. The embodiments are not limited in this context.

In some embodiments, communication component 506 may receive acceptance message 562 from apparatus 500 and determine that the request to establish the packet transfer session has been granted. In various embodiments, tracking component 508 may configure a tracking parameter set 522 for the packet transfer session. In some embodiments, tracking component 508 may allocate a tracking state for the packet transfer session and associate tracking parameter set 522 with the allocated tracking state. In various embodiments, tracking component 508 may store tracking parameter set 522 in memory 503. In some embodiments, tracking component 508 may identify one or more initiator-side tracking parameters 528 and retain the one or more initiator-side tracking parameters 528 in tracking parameter set 522. In various embodiments, initiator-side tracking parameters 528 may include an identifier associated with send operation 505. In some embodiments, initiator-side tracking parameters 528 may include one or more parameters describing characteristics of application-layer message 507. In various embodiments, initiator-side tracking parameters 528 may include one or more parameters describing characteristics of packets 514. The embodiments are not limited to these examples.

In various embodiments, tracking component 508 may determine that acceptance message 562 comprises a tracking parameter retention request. In some embodiments, in response to this determination, tracking component 508 may retain one or more target-side tracking parameters 530 for the packet transfer session. In various embodiments, tracking component 508 may retain the one or more target-side tracking parameters 530 in the tracking parameter set 522 that it configures for the packet transfer session. In some embodiments, the one or more target-side tracking parameters 530 may include one or more tracking parameters 572 comprised in acceptance message 562. In various embodiments, the one or more target-side tracking parameters 530 may include an identifier associated with receive operation 555. In some embodiments, the one or more target-side tracking parameters 530 may include an identifier associated with receive buffer 568. The embodiments are not limited to these examples.

In various embodiments, in response to receipt of acceptance message 562, communication component 506 may send a plurality of packets 514 to apparatus 550 during a packet transfer session established with apparatus 550. In some embodiments, communication component 556 may receive the plurality of packets 514 at apparatus 550. In various embodiments, communication component 556 may store the plurality of packets 514 in receive buffer 568. In some embodiments, communication component 556 may send a plurality of acknowledgments 566 to apparatus 500, and each such acknowledgment 566 may acknowledge a respective one of the plurality of packets 514. In various embodiments, tracking component 508 may maintain packet acknowledgment information 532 at apparatus 500 during the packet transfer session. In some embodiments, tracking component 508 may maintain packet acknowledgment information 532 based on acknowledgments 566 sent by apparatus 550. In various embodiments, at any point in time during the packet transfer session, packet acknowledgment information 532 may identify each packet 514 that has been acknowledged by apparatus 550. The embodiments are not limited in this context.

In some embodiments, tracking component 508 may determine that apparatus 550 has acknowledged each of the plurality of packets 514. In various embodiments, tracking component 508 may perform this determination based on packet acknowledgment information 532. In some embodiments, in response to such a determination, communication component 506 may send a transfer completion notification 534 to apparatus 550. In various embodiments, communication component 506 may include the one or more target-side tracking parameters 530 within the transfer completion notification 534. In some embodiments, communication component 556 may receive transfer completion notification 534 at apparatus 550. In various embodiments, in response to receipt of transfer completion notification 534, communication component 556 may retrieve the plurality of packets 514 from receive buffer 568 and assemble the plurality of packets. In some embodiments, based on the assembled plurality of packets 514, communication component 556 may reconstruct application-layer message 507. The embodiments are not limited in this context.

In various embodiments, tracking component 508 may retrieve one or more target-side tracking parameters 530 from transfer completion notification 534 and assemble completion information 586 based on the one or more retrieved target-side tracking parameters 530. In some embodiments, tracking component 508 may identify receive operation 555 based on one or more such parameters. In various embodiments, tracking component 508 may return completion information 586 to the application 554 associated with receive operation 555. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
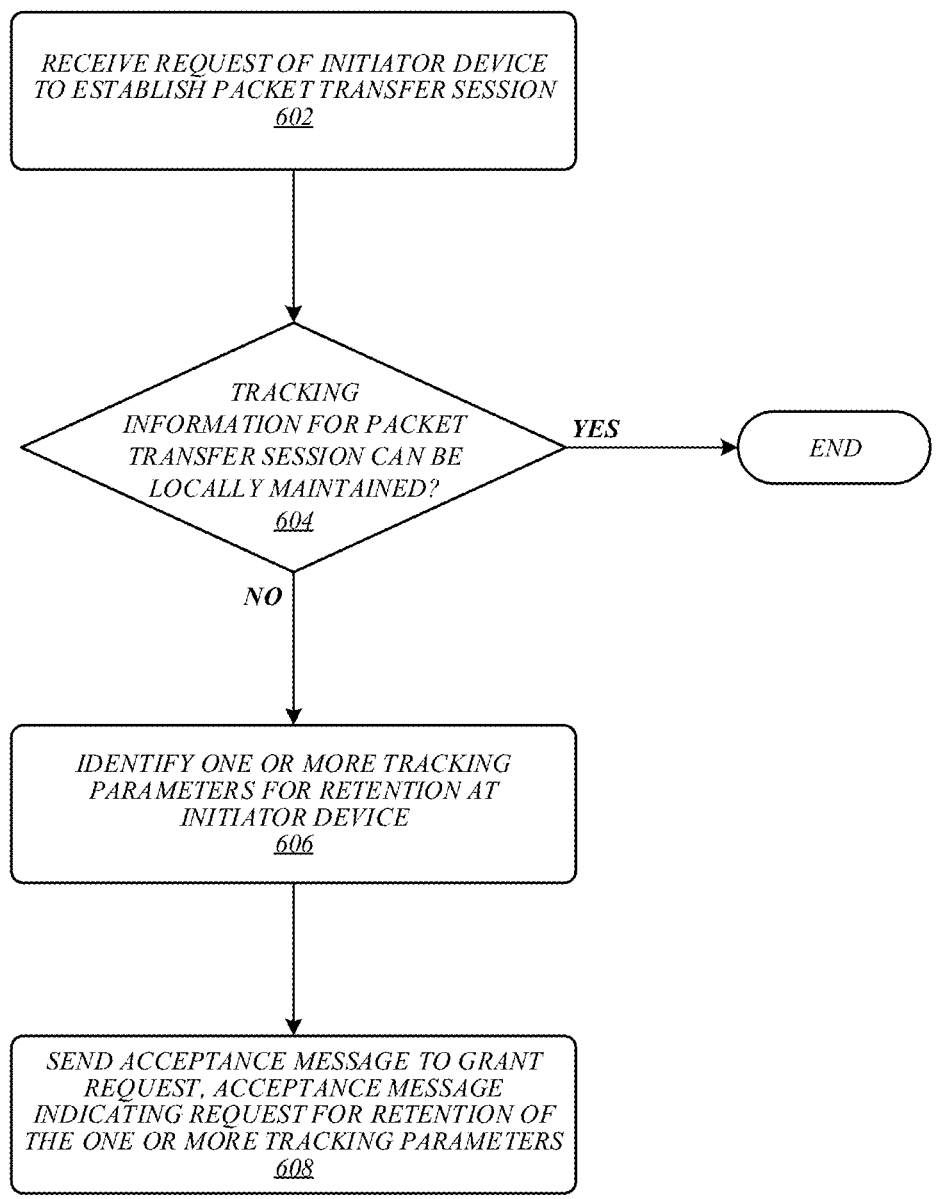
FIG. 6 illustrates an embodiment of a first logic flow.

FIG. 6 illustrates an example of a logic flow 600 that may be representative of the implementation of one or more of the disclosed packet tracking techniques according to some embodiments. For example, logic flow 600 may be representative of operations that may be performed in some embodiments by circuitry 552 in apparatus 550 of FIG. 5. As shown in FIG. 6, a request of an initiator device to establish a packet transfer session may be received at 602. For example, communication component 556 of FIG. 5 may receive request message 510 from apparatus 500. At 604, it may be determined whether tracking information for the packet transfer session can be locally maintained. For example, tracking component 558 of FIG. 5 may determine whether tracking information for a packet transfer session with apparatus 500 can be locally maintained. If it is determined at 604 that the tracking information can be locally maintained, the logic flow may end. If it is determined at 604 that the tracking information cannot be locally maintained, flow may pass to 606. At 606, one or more tracking parameters may be identified for retention at the initiator device. For example, tracking component 558 of FIG. 5 may identify tracking parameters 572. At 608, an acceptance message may be sent to grant the request to establish the packet transfer session, and the acceptance message may indicate a request for retention of the one or more tracking parameters. For example, communication component 556 of FIG. 5 may send acceptance message 562 to apparatus 500, and acceptance message 562 may indicate a request for retention of tracking parameters 572. The embodiments are not limited to these examples.

Figure 7:
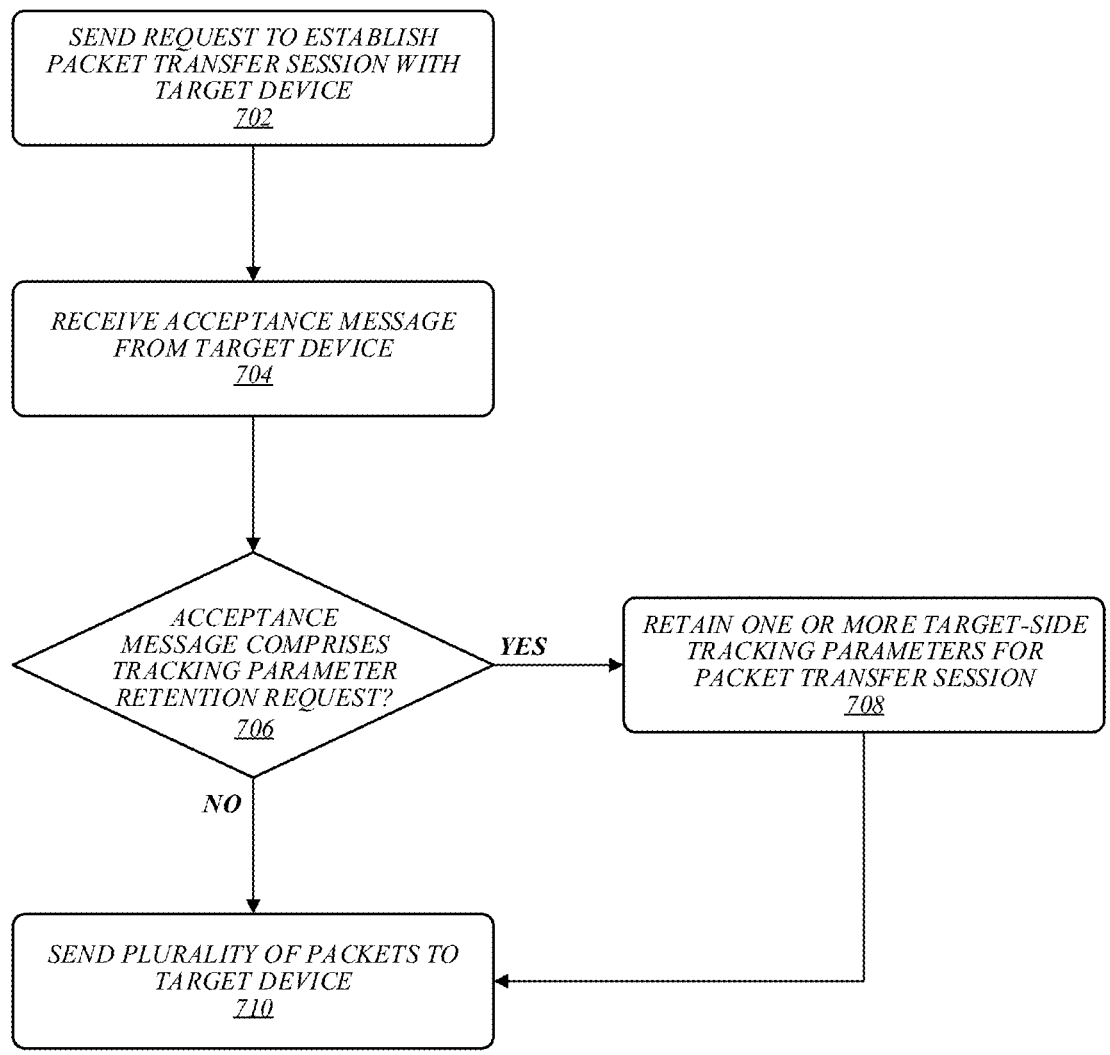
FIG. 7 illustrates an embodiment of a second logic flow.

FIG. 7 illustrates an example of a logic flow 700 that may be representative of the implementation of one or more of the disclosed packet tracking techniques according to various embodiments. For example, logic flow 700 may be representative of operations that may be performed in some embodiments by circuitry 502 in apparatus 500 of FIG. 5. As shown in FIG. 7, a request to establish a packet transfer session with a target device may be sent at 702. For example, communication component 506 of FIG. 5 may send request message 510. At 704, an acceptance message may be received from the target device. For example, communication component 506 of FIG. 5 may receive acceptance message 562 from apparatus 550. At 706, it may be determined whether the acceptance message comprises a tracking parameter retention request. For example, tracking component 508 of FIG. 5 may determine whether acceptance message 562 comprises a tracking parameter retention request. If it is determined that the acceptance message comprises a tracking parameter retention request, flow may pass to 708. At 708, one or more target-side tracking parameters for the packet transfer session may be retained. For example, tracking component 508 of FIG. 5 may retain one or more target-side tracking parameters 530 in tracking parameter set 522. From 508, flow may pass to 710. If it is determined at 706 that the acceptance message does not comprise a tracking parameter retention request, flow may pass directly from 706 to 710. At 710, a plurality of packets may be sent to the target device. For example, communication component 506 of FIG. 5 may send a plurality of packets 714 to apparatus 550. The embodiments are not limited to these examples.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or both of logic flow 600 of FIG. 6 and logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
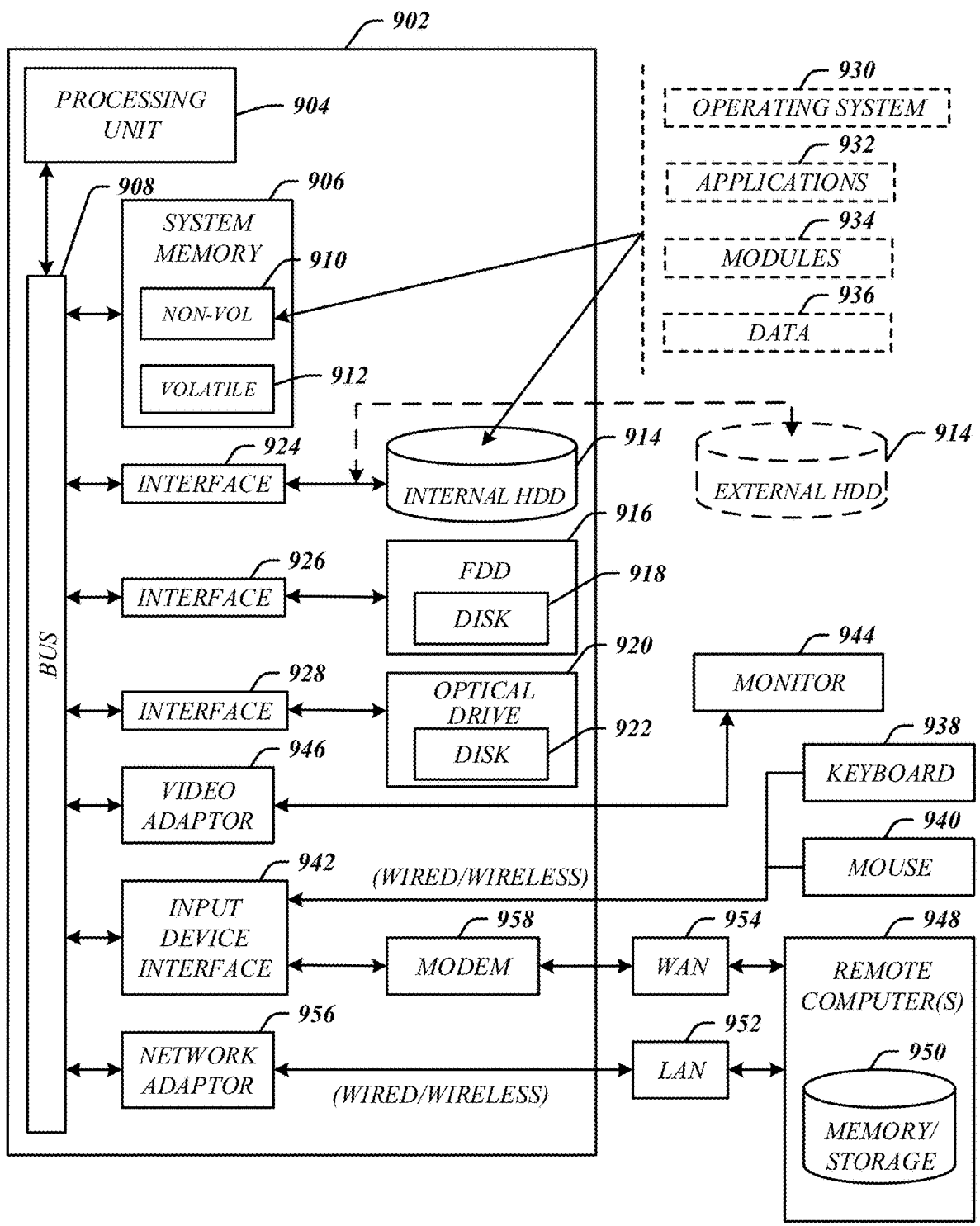
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of one or both of apparatuses 500 and 550 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, various applications and/or components of one or both of apparatuses 500 and 550 of FIG. 5.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device may be also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
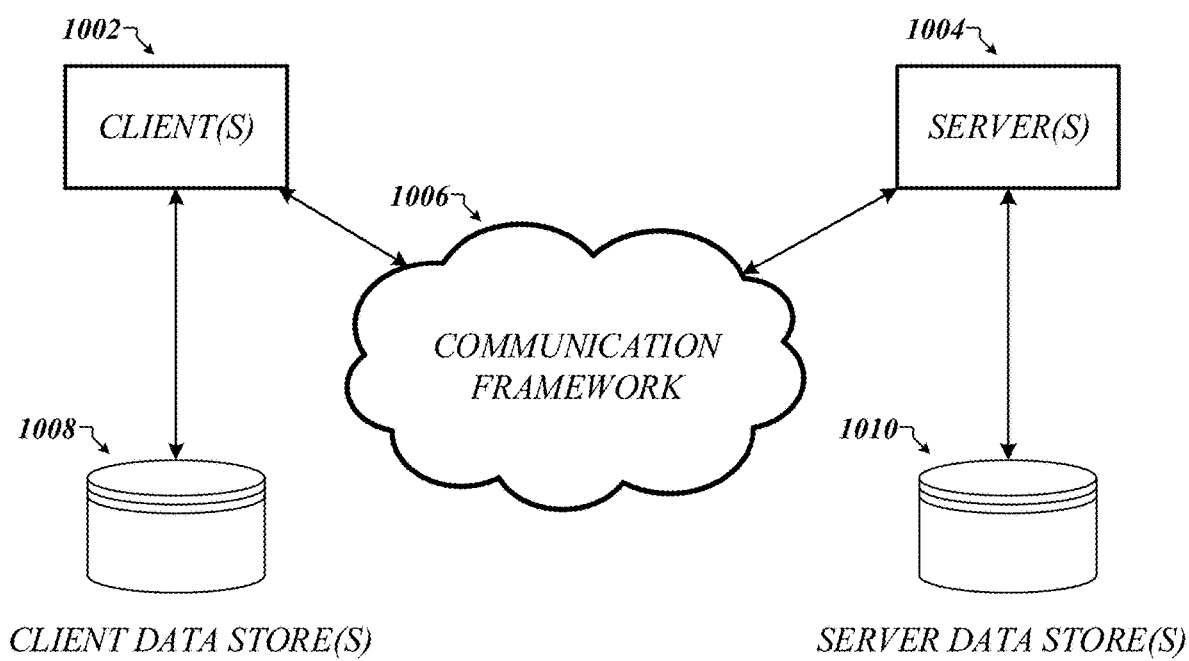
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. Any one of clients 1002 and/or servers 1004 may implement one or more of apparatus 500 and apparatus 550 of FIG. 5, logic flow 600 of FIG. 6, logic flow 700 of FIG. 7, storage medium 800 of FIG. 8, and computing architecture 900 of FIG. 9. In various embodiments, one or both of apparatuses 500 and 550 of FIG. 5 may be implemented in one or more switching devices and/or routing devices in communication framework 1006.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising circuitry, a tracking component for execution by the circuitry to in response to a request of an initiator device to establish a packet transfer session, determine whether tracking information for the packet transfer session can be locally maintained, and in response to a determination that the tracking information for the packet transfer session cannot be locally maintained, identify one or more tracking parameters for retention at the initiator device, and a communication component for execution by the circuitry to send an acceptance message to grant the request of the initiator device to establish the packet transfer session, the acceptance message to indicate a request for retention of the one or more tracking parameters.

Example 2 is the apparatus of Example 1, the tracking component for execution by the circuitry to determine whether the tracking information can be locally maintained based on whether a tracking state can be allocated for the packet transfer session.

Example 3 is the apparatus of any of Examples 1 to 2, the communication component for execution by the circuitry to identify one or more receive buffers allocated to a receive operation associated with the packet transfer session, and select a receive buffer for the packet transfer session from among the one or more identified receive buffers.

Example 4 is the apparatus of Example 3, the communication component for execution by the circuitry to include an identifier for the selected receive buffer in the acceptance message.

Example 5 is the apparatus of any of Examples 3 to 4, the communication component for execution by the circuitry to include an identifier for the receive operation in the acceptance message.

Example 6 is the apparatus of any of Examples 3 to 5, the communication component for execution by the circuitry to receive a plurality of packets from the initiator device during the packet transfer session, and store the plurality of packets in the selected receive buffer.

Example 7 is the apparatus of Example 6, the communication component for execution by the circuitry to send a respective acknowledgment of each of the plurality of packets.

Example 8 is the apparatus of any of Examples 6 to 7, the communication component for execution by the circuitry to retrieve the plurality of packets from the selected receive buffer and assemble the plurality of packets in response to receipt of a transfer completion notification for the packet transfer session.

Example 9 is the apparatus of Example 8, the transfer completion notification to comprise the one or more tracking parameters.

Example 10 is the apparatus of Example 9, the tracking component for execution by the circuitry to retrieve the one or more tracking parameters from the transfer completion notification, assemble completion information for the packet transfer session based on the one or more retrieved tracking parameters, and return the completion information to an application associated with the receive operation.

Example 11 is the apparatus of Example 10, the tracking component for execution by the circuitry to identify the receive operation based on at least one of the one or more retrieved tracking parameters.

Example 12 is a system, comprising an apparatus according to any of Examples 1 to 11, and at least one network interface.

Example 13 is an apparatus, comprising circuitry, a communication component for execution by the circuitry to send a request to establish a packet transfer session with a target device, and in response to receipt of an acceptance message from the target device, send a plurality of packets to the target device, and a tracking component for execution by the circuitry to retain one or more target-side tracking parameters for the packet transfer session in response to a determination that the acceptance message comprises a tracking parameter retention request.

Example 14 is the apparatus of Example 13, the tracking component for execution by the circuitry to configure a tracking parameter set for the packet transfer session, and retain the one or more target-side tracking parameters in the tracking parameter set.

Example 15 is the apparatus of Example 14, the tracking component for execution by the circuitry to allocate a tracking state for the packet transfer session, and associate the tracking parameter set with the allocated tracking state.

Example 16 is the apparatus of any of Examples 14 to 15, the tracking component for execution by the circuitry to identify one or more initiator-side tracking parameters for the packet transfer session, and retain the one or more initiator-side tracking parameters in the tracking parameter set.

Example 17 is the apparatus of any of Examples 13 to 16, the acceptance message to comprise at least one of the one or more target-side tracking parameters.

Example 18 is the apparatus of any of Examples 13 to 17, the one or more target-side tracking parameters to include an identifier for a receive operation of the target device.

Example 19 is the apparatus of any of Examples 13 to 18, the one or more target-side tracking parameters to include an identifier for a receive buffer of the target device.

Example 20 is the apparatus of any of Examples 13 to 19, the tracking component for execution by the circuitry to maintain packet acknowledgment information during the packet transfer session, the packet acknowledgment information to identify packets acknowledged by the target device.

Example 21 is the apparatus of any of Examples 13 to 20, the communication component for execution by the circuitry to send a transfer completion notification to the target device in response to a determination that the target device has acknowledged receipt of each of the plurality of packets.

Example 22 is the apparatus of Example 21, the transfer completion notification to contain an identifier for a receive operation associated with the packet transfer session.

Example 23 is the apparatus of any of Examples 21 to 22, the transfer completion notification to contain an identifier for a receive buffer of the target device.

Example 24 is a system, comprising an apparatus according to any of Examples 13 to 23, and at least one network interface.

Example 25 is at least one computer-readable storage medium comprising a set of instructions that, in response to being executed on a computing device, cause the computing device to in response to a request of an initiator device to establish a packet transfer session, determine whether tracking information for the packet transfer session can be locally maintained, identify one or more tracking parameters for retention at the initiator device in response to a determination that the tracking information for the packet transfer session cannot be locally maintained, and send an acceptance message to grant the request of the initiator device to establish the packet transfer session, the acceptance message to indicate a request for retention of the one or more tracking parameters.

Example 26 is the at least one computer-readable storage medium of Example 25, comprising instructions that, in response to being executed on the computing device, cause the computing device to determine whether the tracking information can be locally maintained based on whether a tracking state can be allocated for the packet transfer session.

Example 27 is the at least one computer-readable storage medium of any of Examples 25 to 26, comprising instructions that, in response to being executed on the computing device, cause the computing device to identify one or more receive buffers allocated to a receive operation associated with the packet transfer session, and select a receive buffer for the packet transfer session from among the one or more identified receive buffers.

Example 28 is the at least one computer-readable storage medium of Example 27, comprising instructions that, in response to being executed on the computing device, cause the computing device to include an identifier for the selected receive buffer in the acceptance message.

Example 29 is the at least one computer-readable storage medium of any of Examples 27 to 28, comprising instructions that, in response to being executed on the computing device, cause the computing device to include an identifier for the receive operation in the acceptance message.

Example 30 is the at least one computer-readable storage medium of any of Examples 27 to 29, comprising instructions that, in response to being executed on the computing device, cause the computing device to receive a plurality of packets from the initiator device during the packet transfer session, and store the plurality of packets in the selected receive buffer.

Example 31 is the at least one computer-readable storage medium of Example 30, comprising instructions that, in response to being executed on the computing device, cause the computing device to send a respective acknowledgment of each of the plurality of packets.

Example 32 is the at least one computer-readable storage medium of any of Examples 30 to 31, comprising instructions that, in response to being executed on the computing device, cause the computing device to retrieve the plurality of packets from the selected receive buffer and assemble the plurality of packets in response to receipt of a transfer completion notification for the packet transfer session.

Example 33 is the at least one computer-readable storage medium of Example 32, the transfer completion notification to comprise the one or more tracking parameters.

Example 34 is the at least one computer-readable storage medium of Example 33, comprising instructions that, in response to being executed on the computing device, cause the computing device to retrieve the one or more tracking parameters from the transfer completion notification, assemble completion information for the packet transfer session based on the one or more retrieved tracking parameters, and return the completion information to an application associated with the receive operation.

Example 35 is the at least one computer-readable storage medium of Example 34, comprising instructions that, in response to being executed on the computing device, cause the computing device to identify the receive operation based on at least one of the one or more retrieved tracking parameters.

Example 36 is at least one computer-readable storage medium comprising a set of instructions that, in response to being executed on a computing device, cause the computing device to send a request to establish a packet transfer session with a target device, send a plurality of packets to the target device in response to receipt of an acceptance message from the target device, and retain one or more target-side tracking parameters for the packet transfer session in response to a determination that the acceptance message comprises a tracking parameter retention request.

Example 37 is the at least one computer-readable storage medium of Example 36, comprising instructions that, in response to being executed on the computing device, cause the computing device to configure a tracking parameter set for the packet transfer session, and retain the one or more target-side tracking parameters in the tracking parameter set.

Example 38 is the at least one computer-readable storage medium of Example 37, comprising instructions that, in response to being executed on the computing device, cause the computing device to allocate a tracking state for the packet transfer session, and associate the tracking parameter set with the allocated tracking state.

Example 39 is the at least one computer-readable storage medium of any of Examples 37 to 38, comprising instructions that, in response to being executed on the computing device, cause the computing device to identify one or more initiator-side tracking parameters for the packet transfer session, and retain the one or more initiator-side tracking parameters in the tracking parameter set.

Example 40 is the at least one computer-readable storage medium of any of Examples 36 to 39, the acceptance message to comprise at least one of the one or more target-side tracking parameters.

Example 41 is the at least one computer-readable storage medium of any of Examples 36 to 40, the one or more target-side tracking parameters to include an identifier for a receive operation of the target device.

Example 42 is the at least one computer-readable storage medium of any of Examples 36 to 41, the one or more target-side tracking parameters to include an identifier for a receive buffer of the target device.

Example 43 is the at least one computer-readable storage medium of any of Examples 36 to 42, comprising instructions that, in response to being executed on the computing device, cause the computing device to maintain packet acknowledgment information during the packet transfer session, the packet acknowledgment information to identify packets acknowledged by the target device.

Example 44 is the at least one computer-readable storage medium of any of Examples 36 to 43, comprising instructions that, in response to being executed on the computing device, cause the computing device to send a transfer completion notification to the target device in response to a determination that the target device has acknowledged receipt of each of the plurality of packets.

Example 45 is the at least one computer-readable storage medium of Example 44, the transfer completion notification to contain an identifier for a receive operation associated with the packet transfer session.

Example 46 is the at least one computer-readable storage medium of any of Examples 44 to 45, the transfer completion notification to contain an identifier for a receive buffer of the target device.

Example 47 is a method, comprising in response to a request of an initiator device to establish a packet transfer session, determining, by a processor circuit, whether tracking information for the packet transfer session can be locally maintained, identifying one or more tracking parameters for retention at the initiator device in response to a determination that the tracking information for the packet transfer session cannot be locally maintained, and sending an acceptance message to grant the request of the initiator device to establish the packet transfer session, the acceptance message to indicate a request for retention of the one or more tracking parameters.

Example 48 is the method of Example 47, comprising determining whether the tracking information can be locally maintained based on whether a tracking state can be allocated for the packet transfer session.

Example 49 is the method of any of Examples 47 to 48, comprising identifying one or more receive buffers allocated to a receive operation associated with the packet transfer session, and selecting a receive buffer for the packet transfer session from among the one or more identified receive buffers.

Example 50 is the method of Example 49, comprising including an identifier for the selected receive buffer in the acceptance message.

Example 51 is the method of any of Examples 49 to 50, comprising including an identifier for the receive operation in the acceptance message.

Example 52 is the method of any of Examples 49 to 51, comprising receiving a plurality of packets from the initiator device during the packet transfer session, and storing the plurality of packets in the selected receive buffer.

Example 53 is the method of Example 52, comprising sending a respective acknowledgment of each of the plurality of packets.

Example 54 is the method of any of Examples 52 to 53, comprising retrieving the plurality of packets from the selected receive buffer and assembling the plurality of packets in response to receipt of a transfer completion notification for the packet transfer session.

Example 55 is the method of Example 54, the transfer completion notification to comprise the one or more tracking parameters.

Example 56 is the method of Example 55, comprising retrieving the one or more tracking parameters from the transfer completion notification, assembling completion information for the packet transfer session based on the one or more retrieved tracking parameters, and returning the completion information to an application associated with the receive operation.

Example 57 is the method of Example 56, comprising identifying the receive operation based on at least one of the one or more retrieved tracking parameters.

Example 58 is at least one computer-readable storage medium comprising a set of instructions that, in response to being executed on a computing device, cause the computing device to perform a method according to any of Examples 46 to 57.

Example 59 is an apparatus, comprising means for performing a method according to any of Examples 46 to 57.

Example 60 is a system, comprising the apparatus of Example 59, and at least one network interface.

Example 61 is a method, comprising sending, by a computing device, a request to establish a packet transfer session with a target device, sending a plurality of packets to the target device in response to receipt of an acceptance message from the target device, and retaining one or more target-side tracking parameters for the packet transfer session in response to a determination that the acceptance message comprises a tracking parameter retention request.

Example 62 is the method of Example 61, comprising configuring a tracking parameter set for the packet transfer session, and retaining the one or more target-side tracking parameters in the tracking parameter set.

Example 63 is the method of Example 62, comprising allocating a tracking state for the packet transfer session, and associating the tracking parameter set with the allocated tracking state.

Example 64 is the method of any of Examples 62 to 63, comprising identifying one or more initiator-side tracking parameters for the packet transfer session, and retaining the one or more initiator-side tracking parameters in the tracking parameter set.

Example 65 is the method of any of Examples 61 to 64, the acceptance message to comprise at least one of the one or more target-side tracking parameters.

Example 66 is the method of any of Examples 61 to 65, the one or more target-side tracking parameters to include an identifier for a receive operation of the target device.

Example 67 is the method of any of Examples 61 to 66, the one or more target-side tracking parameters to include an identifier for a receive buffer of the target device.

Example 68 is the method of any of Examples 61 to 67, comprising maintaining packet acknowledgment information during the packet transfer session, the packet acknowledgment information to identify packets acknowledged by the target device.

Example 69 is the method of any of Examples 61 to 68, comprising sending a transfer completion notification to the target device in response to a determination that the target device has acknowledged receipt of each of the plurality of packets.

Example 70 is the method of Example 69, the transfer completion notification to contain an identifier for a receive operation associated with the packet transfer session.

Example 71 is the method of any of Examples 69 to 70, the transfer completion notification to contain an identifier for a receive buffer of the target device.

Example 72 is at least one computer-readable storage medium comprising a set of instructions that, in response to being executed on a computing device, cause the computing device to perform a method according to any of Examples 61 to 71.

Example 73 is an apparatus, comprising means for performing a method according to any of Examples 61 to 71.

Example 74 is a system, comprising the apparatus of Example 73, and at least one network interface.

Example 75 is an apparatus, comprising means for, in response to a request of an initiator device to establish a packet transfer session, determining whether tracking information for the packet transfer session can be locally maintained, means for identifying one or more tracking parameters for retention at the initiator device in response to a determination that the tracking information for the packet transfer session cannot be locally maintained, and means for sending an acceptance message to grant the request of the initiator device to establish the packet transfer session, the acceptance message to indicate a request for retention of the one or more tracking parameters.

Example 76 is the apparatus of Example 75, comprising means for determining whether the tracking information can be locally maintained based on whether a tracking state can be allocated for the packet transfer session.

Example 77 is the apparatus of any of Examples 75 to 76, comprising means for identifying one or more receive buffers allocated to a receive operation associated with the packet transfer session, and means for selecting a receive buffer for the packet transfer session from among the one or more identified receive buffers.

Example 78 is the apparatus of Example 77, comprising means for including an identifier for the selected receive buffer in the acceptance message.

Example 79 is the apparatus of any of Examples 77 to 78, comprising means for including an identifier for the receive operation in the acceptance message.

Example 80 is the apparatus of any of Examples 77 to 79, comprising means for receiving a plurality of packets from the initiator device during the packet transfer session, and means for storing the plurality of packets in the selected receive buffer.

Example 81 is the apparatus of Example 80, comprising means for sending a respective acknowledgment of each of the plurality of packets.

Example 82 is the apparatus of any of Examples 80 to 81, comprising means for retrieving the plurality of packets from the selected receive buffer and assembling the plurality of packets in response to receipt of a transfer completion notification for the packet transfer session.

Example 83 is the apparatus of Example 82, the transfer completion notification to comprise the one or more tracking parameters.

Example 84 is the apparatus of Example 83, comprising means for retrieving the one or more tracking parameters from the transfer completion notification, means for assembling completion information for the packet transfer session based on the one or more retrieved tracking parameters, and means for returning the completion information to an application associated with the receive operation.

Example 85 is the apparatus of Example 84, comprising means for identifying the receive operation based on at least one of the one or more retrieved tracking parameters.

Example 86 is a system, comprising an apparatus according to any of Examples 75 to 85, and at least one network interface.

Example 87 is an apparatus, comprising means for sending a request to establish a packet transfer session with a target device, means for sending a plurality of packets to the target device in response to receipt of an acceptance message from the target device, and means for retaining one or more target-side tracking parameters for the packet transfer session in response to a determination that the acceptance message comprises a tracking parameter retention request.

Example 88 is the apparatus of Example 87, comprising means for configuring a tracking parameter set for the packet transfer session, and means for retaining the one or more target-side tracking parameters in the tracking parameter set.

Example 89 is the apparatus of Example 88, comprising means for allocating a tracking state for the packet transfer session, and means for associating the tracking parameter set with the allocated tracking state.

Example 90 is the apparatus of any of Examples 88 to 89, comprising means for identifying one or more initiator-side tracking parameters for the packet transfer session, and means for retaining the one or more initiator-side tracking parameters in the tracking parameter set.

Example 91 is the apparatus of any of Examples 87 to 91, the acceptance message to comprise at least one of the one or more target-side tracking parameters.

Example 92 is the apparatus of any of Examples 87 to 91, the one or more target-side tracking parameters to include an identifier for a receive operation of the target device.

Example 93 is the apparatus of any of Examples 87 to 92, the one or more target-side tracking parameters to include an identifier for a receive buffer of the target device.

Example 94 is the apparatus of any of Examples 87 to 93, comprising means for maintaining packet acknowledgment information during the packet transfer session, the packet acknowledgment information to identify packets acknowledged by the target device.

Example 95 is the apparatus of any of Examples 87 to 94, comprising means for sending a transfer completion notification to the target device in response to a determination that the target device has acknowledged receipt of each of the plurality of packets.

Example 96 is the apparatus of Example 95, the transfer completion notification to contain an identifier for a receive operation associated with the packet transfer session.

Example 97 is the apparatus of any of Examples 95 to 96, the transfer completion notification to contain an identifier for a receive buffer of the target device.

Example 98 is a system, comprising an apparatus according to any of Examples 87 to 97, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a processor; and
    a memory storing instructions which when executed by the processor cause the processor to:
        in response to a request of an initiator device to establish a packet transfer session, determine whether a limit of tracking information that can be locally maintained has been reached;
        identify one or more tracking parameters for retention at the initiator device responsive to a determination that the limit of tracking information that can be locally maintained has been reached; and
        send an acceptance message to grant the request of the initiator device to establish the packet transfer session, the acceptance message to indicate a request for retention of the one or more tracking parameters.

2. The apparatus of claim 1, the memory storing instructions which when executed by the processor cause the processor to:
    determine whether the limit of tracking information that can be locally maintained has been reached based on whether a tracking state can be allocated for the packet transfer session in a receive buffer.

3. The apparatus of claim 1, the memory storing instructions which when executed by the processor cause the processor to:
    identify one or more receive buffers allocated to a receive operation associated with the packet transfer session; and
    select a receive buffer for the packet transfer session from among the one or more identified receive buffers.

4. The apparatus of claim 3, the memory storing instructions which when executed by the processor cause the processor to:
    include one or more of an identifier for the selected receive buffer and an identifier for the receive operation in the acceptance message.

5. The apparatus of claim 3, the memory storing instructions which when executed by the processor cause the processor to:
    receive a plurality of packets from the initiator device during the packet transfer session;
    send a respective acknowledgment of each of the plurality of packets; and
    store each of the plurality of packets in the selected receive buffer.

6. The apparatus of claim 5, the memory storing instructions which when executed by the processor cause the processor to:
    receive the plurality of packets from the selected receive buffer and assemble the plurality of packets in response to receipt of a transfer completion notification for the packet transfer session, the transfer completion notification to comprise the one or more tracking parameters.

7. The apparatus of claim 6, the memory storing instructions which when executed by the processor cause the processor to:
    receive the one or more tracking parameters from the transfer completion notification;

assemble completion information for the packet transfer session based on the one or more tracking parameters; and return the completion information to an application associated with the receive operation.

8. An apparatus, comprising:

a processor; and a memory storing instructions which when executed by the processor cause the processor to:

send a request to establish a packet transfer session with a target device;

in response to receipt of an acceptance message from the target device, send a plurality of packets to the target device; and retain one or more target-side tracking parameters for the packet transfer session in response to a determination that the acceptance message comprises a tracking parameter retention request.

9. The apparatus of claim 8, the memory storing instructions which when executed by the processor cause the processor to:

maintain packet acknowledgment information during the packet transfer session, the packet acknowledgment information to identify packets acknowledged by the target device.

10. The apparatus of claim 9, the memory storing instructions which when executed by the processor cause the processor to:

send a transfer completion notification to the target device in response to a determination that the target device has acknowledged receipt of each of the plurality of packets.

11. The apparatus of claim 10, the transfer completion notification to comprise the one or more target-side tracking parameters.

12. The apparatus of claim 8, the one or more target-side tracking parameters to include one or more of:

an identifier for a receive operation of the target device; and an identifier for a receive buffer of the target device.

13. The apparatus of claim 8, the memory storing instructions which when executed by the processor cause the processor to:

allocate a tracking state for the packet transfer session;

associate a tracking parameter set with the allocated tracking state; and retain the one or more target-side tracking parameters in the tracking parameter set.

14. The apparatus of claim 13, the memory storing instructions which when executed by the processor cause the processor to:

retain one or more initiator-side tracking parameters in the tracking parameter set.

15. A non-transitory computer-readable storage medium storing instructions that, in response to being executed by a processor, cause the processor to:

in response to a request of an initiator device to establish a packet transfer session, determine whether a limit of tracking information that can be locally maintained has been reached;

identify one or more tracking parameters for retention at the initiator device responsive to a determination that the limit of tracking information that can be locally maintained has been reached; and send an acceptance message to grant the request of the initiator device to establish the packet transfer session, the acceptance message to indicate a request for retention of the one or more tracking parameters.

16. The non-transitory computer-readable storage medium of claim 15, storing instructions that, in response to being executed by the processor, cause the processor to:

determine whether the limit of tracking information that can be locally maintained has been reached based on whether a tracking state can be allocated for the packet transfer session in a receive buffer.

17. The non-transitory computer-readable storage medium of claim 15, storing instructions that, in response to being executed by the processor, cause the processor to:

identify one or more receive buffers allocated to a receive operation associated with the packet transfer session; and select a receive buffer for the packet transfer session from among the one or more identified receive buffers.

18. The non-transitory computer-readable storage medium of claim 17, storing instructions that, in response to being executed by the processor, cause the processor to:

include one or more of an identifier for the selected receive buffer and an identifier for the receive operation in the acceptance message.

19. The non-transitory computer-readable storage medium of claim 17, storing instructions that, in response to being executed by the processor, cause the processor to:

receive a plurality of packets from the initiator device during the packet transfer session;

send a respective acknowledgment of each of the plurality of packets; and store each of the plurality of packets in the selected receive buffer.

20. The non-transitory computer-readable storage medium of claim 19, storing instructions that, in response to being executed by the processor, cause the processor to:

receive the plurality of packets from the selected receive buffer and assemble the plurality of packets in response to receipt of a transfer completion notification for the packet transfer session, the transfer completion notification to comprise the one or more tracking parameters.

21. The non-transitory computer-readable storage medium of claim 15, storing instructions that, in response to being executed by the processor, cause the processor to:

in response to the determination that the limit of tracking information that can be locally maintained has not been reached, maintain the tracking information locally.

22. A non-transitory computer-readable storage medium storing instructions that, in response to being executed by a processor, cause the processor to:

send a request to establish a packet transfer session with a target device;

send a plurality of packets to the target device in response to receipt of an acceptance message from the target device; and retain one or more target-side tracking parameters for the packet transfer session in response to a determination that the acceptance message comprises a tracking parameter retention request.

23. The non-transitory computer-readable storage medium of claim 22, storing instructions that, in response to being executed by the processor, cause the processor to:

maintain packet acknowledgment information during the packet transfer session, the packet acknowledgment information to identify packets acknowledged by the target device.

24. The non-transitory computer-readable storage medium of claim 22, storing instructions that, in response to being executed by the processor, cause the processor to:
  send a transfer completion notification to the target device in response to a determination that the target device has acknowledged receipt of each of the plurality of packets, the transfer completion notification to comprise the one or more target-side tracking parameters.

25. The non-transitory computer-readable storage medium of claim 22, the one or more target-side tracking parameters to include one or more of:
  an identifier for a receive operation of the target device; and
  an identifier for a receive buffer of the target device.

26. The non-transitory computer-readable storage medium of claim 22, storing instructions that, in response to being executed by the processor, cause the processor to:
  allocate a tracking state for the packet transfer session;
  associate a tracking parameter set with the allocated tracking state;
  retain one or more initiator-side tracking parameters in the tracking parameter set; and
  retain the one or more target-side tracking parameters in the tracking parameter set.

* * * * *